US007072398B2

(12) United States Patent
Ma

(10) Patent No.: US 7,072,398 B2
(45) Date of Patent: Jul. 4, 2006

(54) SYSTEM AND METHOD FOR MOTION VECTOR GENERATION AND ANALYSIS OF DIGITAL VIDEO CLIPS

(76) Inventor: Kai-Kuang Ma, Block 71, #04-17, Choa Chu Kang Loop, (Northvale) Singapore 689673 (SG)

( * ) Notice: Subject to any disclaimer, the term of this patent is extended or adjusted under 35 U.S.C. 154(b) by 728 days.

(21) Appl. No.: 10/007,223

(22) Filed: Nov. 2, 2001

(65) Prior Publication Data
US 2002/0114394 A1 Aug. 22, 2002

Related U.S. Application Data

(60) Provisional application No. 60/251,709, filed on Dec. 6, 2000.

(51) Int. Cl.
*H04N 7/12* (2006.01)
(52) U.S. Cl. ............... 375/240.16; 382/236; 348/416.1
(58) Field of Classification Search ........... 375/240.16, 375/240.15, 240.24, 296; 382/236; 348/699, 348/416.1
See application file for complete search history.

(56) References Cited

U.S. PATENT DOCUMENTS 5,801,778 A * 9/1998 Ju ........................ 375/240.15
5,969,764 A 10/1999 Sun et al.
6,014,181 A * 1/2000 Sun ............................ 348/699
6,195,398 B1 * 2/2001 Huloux ........................ 375/296
6,363,117 B1 * 3/2002 Kok ....................... 375/240.24
6,567,469 B1 * 5/2003 Rackett ................. 375/240.16

OTHER PUBLICATIONS

Eng, H. and Ma, K. Noise Adaptive Soft-Switching Median Filter For Image Denoising, School of Electrical and Electronic Engineering, Second Int'l Conf. on Inf. Comm and Signal Proc. (ICICS '99)Singapore, Dec. 1999, pp. 1-4.
Eng, H. and Ma, K. Motion Trajectory Extraction Based On Macroblock Motion Vectors For Video Indexing, Inf. Conf. on Image Processing (1999) pp 27 AP2.
Hosur, P. and Ma, K. Motion Vector Field Adaptive Fast Motion Estimation, IEEE Transactions on Image Processing, V. 10, No. 2, pp. 242-251,Feb. 2001.

* cited by examiner

*Primary Examiner*—Gims Philippe
(74) *Attorney, Agent, or Firm*—William J. Sapone; Coleman Sudol; Sapone P.C.

(57) ABSTRACT

Given a digital video clip, this invention describes how to efficiently compute the motion vectors and motion trajectory of each identified video object for facilitating various commonly encountered visual applications, such as video compression for transmission and archiving, security and surveillance monitoring, and search-by-query required in the Internet search engine or digital library.

10 Claims, 13 Drawing Sheets

|  | | Systolic Array ⇧ | | | | | | | |
|---|---|---|---|---|---|---|---|---|---|
|  | t=0 | $R_{0,0}$ | $r_{0,1}$ | $r_{0,2}$ | $r_{0,3}$ | ... | ... | $r_{0,15}$ | * | * |
|  | t=1 | $R_{1,0}$ | $r_{1,1}$ | $r_{1,2}$ | $r_{1,3}$ | ... | ... | $r_{1,15}$ | $r_{1,16}$ | * |
|  | t=2 | $R_{2,0}$ | $r_{2,1}$ | $r_{2,2}$ | $r_{2,3}$ | ... | ... | $r_{2,15}$ | $r_{2,16}$ | $r_{2,17}$ |
|  | ⋮ | ⋮ | ⋮ | ⋮ | ⋮ | ⋮ | ⋮ | ⋮ | ⋮ | ⋮ |
|  | t=15 | $r_{15,0}$ | $r_{15,1}$ | $r_{15,2}$ | $r_{15,3}$ | ... | ... | $r_{15,15}$ | $r_{15,16}$ | $r_{15,17}$ |
| slot 1 | t=16 | * | $r_{16,1}$ | $r_{16,2}$ | $r_{16,3}$ | ... | ... | $r_{16,15}$ | $r_{16,16}$ | $r_{16,17}$ |
| slot 2 | t=17 | * | * | $r_{17,2}$ | $r_{17,3}$ | ... | ... | $r_{17,15}$ | $r_{17,16}$ | $r_{17,17}$ |
|  | t=18 | $r_{1,-1}$ | $r_{1,0}$ | $r_{1,1}$ | $r_{1,2}$ | ... | ... | $r_{1,14}$ | * | * |
|  | t=19 | $r_{2,-1}$ | $r_{2,0}$ | $r_{2,1}$ | $r_{2,2}$ | ... | ... | $r_{2,14}$ | $r_{2,15}$ | * |
|  | t=20 | $r_{3,-1}$ | $r_{3,0}$ | $r_{3,1}$ | $r_{3,2}$ | ... | ... | $r_{3,14}$ | $r_{3,15}$ | $r_{3,16}$ |
|  | ⋮ | ⋮ | ⋮ | ⋮ | ⋮ | ⋮ | ⋮ | ⋮ | ⋮ | ⋮ |
|  | t=33 | $r_{16,-1}$ | $r_{16,0}$ | $r_{16,1}$ | $r_{16,2}$ | ... | ... | $r_{16,14}$ | $r_{16,15}$ | $r_{16,16}$ |
| slot 1 | t=34 | * | $r_{17,0}$ | $r_{17,1}$ | $r_{17,2}$ | ... | ... | $r_{17,14}$ | $r_{17,15}$ | $r_{17,16}$ |
| slot 2 | t=35 | * | * | $r_{18,1}$ | $r_{18,2}$ | ... | ... | $r_{18,14}$ | $r_{18,15}$ | $r_{18,16}$ |
|  | t=36 | $r_{2,-2}$ | $r_{2,-1}$ | $r_{2,0}$ | $r_{2,1}$ | ... | ... | $r_{2,13}$ | * | * |
|  | t=37 | $r_{3,-2}$ | $r_{3,-1}$ | $r_{3,0}$ | $r_{3,1}$ | ... | ... | $r_{3,13}$ | $r_{3,14}$ | * |
|  | ⋮ | ⋮ | ⋮ | ⋮ | ⋮ | ⋮ | ⋮ | ⋮ | ⋮ | ⋮ |

Fig. 11(b)

SYSTEM AND METHOD FOR MOTION VECTOR GENERATION AND ANALYSIS OF DIGITAL VIDEO CLIPS

CROSS-REFERENCE TO RELATED APPLICATIONS

This application claims priority in U.S. Provisional patent application No. 60/251,709 filed Dec. 6, 2000.

TECHNICAL FIELD

This invention relates to a system and method for performing fast generation of motion vectors from the digital video frames, as well as the motion trajectory extraction of each identified video object based on the generated motion vectors. The process of generating motion vectors is often required in digital video compression for real-time visual communications and digital video archiving. The process of generating video-object motion trajectory is particularly useful to the applications such as surveillance monitoring or searching over the distributed digital video databases for retrieving relevant video clips based on the query.

In addition, the invented motion-trajectory matching scheme presented in the last part of the system is a generic solution for measuring the distance or degree of similarity between a pair of digital information sequences under comparison, and can be directly exploited for other kinds of data, such as handwriting curves, musical notes, or audio patterns.

BACKGROUND

In the era of multimedia communications, many technical challenges are incurred in the processing of digital video, due to its large amount of data involved and limited channel bandwidth in practice. For example, in teleconferencing or videophone application, how to transmit the digital video (say, acquired through digital camera) to the receiver in real time for visual communications requires compression process. As a result, the original amount of video data could be greatly reduced by discarding those redundant information while keeping those essential ones as much intact as possible in order to maintain the original video quality at the receiver side after reconstruction. Such video processing is so-called digital video coding.

A basic method for compressing the amount of digital color video data for fitting into the bandwidth has been adopted by the Motion Picture Experts Group (NPEG), which produces MPEG-1, MPEG-2, and MPEG-4 compression standards. MPEG achieves high data compression by utilizing Discrete Cosine Transform (DCT) technique for the intra-coded pictures (called I-frames) and motion estimation and compensation technique for the inter-coded pictures (called P-frames or B-frames). I-frames occur only every so often and are the least compressed frames; thus, yielding highest video quality and being used as reference anchor frames. The frames exist between the I-frames are P-frames and/or B-frames generated based on nearby I-frames and/or existing P-frames. The fast motion estimation for generating motion vectors is conducted for the P-frames and B-frames only. A typical frame structure could be IBBPBBPBBPBBPBB IBBPB . . . , being repeated so until the last video frame. The so-called Group of Picture (GOP) begins with an I-frame and ends on the frame that is proceeded by the next I-frame. In the above example, the size of GOP is 15.

For generating motion vectors by performing motion estimation, each P-frame is partitioned into smaller blocks of pixel data; typically, 16×16 in size, called macroblock (MB) in MPEG's jargon. Then, each MB will be shifted around its neighborhood on the previous I-frame or P-frame in order to find out the most resembled block within the imposed search range. Hence, only the motion vector of the most resembled block is recorded and used to represent the corresponding MB. The motion estimation for the B-frame will be conducted similarly but in both directions, forward prediction and backward prediction.

Note that fast motion estimation methods can be directly exploited into all existing international video-coding standards as well as any proprietary compressions system that adopts similar motion-compensated video coding methodology, as they all share exactly the same approach as above-mentioned in reducing temporal redundancy. Besides MPEG, another set of video coding standards, ITU's H.261, H.263, and H.26L, for teleconferencing or videophone applications also require such motion vector generation.

Since the above-mentioned exhaustive search typically requires large portion (about three-quarters) of total processing time consumed at a typical video encoder. Hence, fast algorithm is indispensable to the realization of real-time visual communications services. For that, we invented a scalable fast motion estimation technique for performing fast motion estimation. The scalability is useful to meet different requirements, such as implementation, delay, distortion, computational load and robustness, while minimizing the incidences of over-search (thus, increasing delay) or under-search (thus, might be increasing distortion). For example, in multimedia PC environment and with such scalable implementation, the user can have few choices in selecting the video quality mode for different visual communications applications, and even under different Internet traffic situations and/or type of services. For example, in videophone, small delay in conversation is probably the most important requirement, for trading off reduced video quality. In another application scenario, a different fast motion estimation algorithm can be selected for creating a high-quality video email (if so desired) and to be sent later on. In this case, it is an off-line video application, from which the delay is not an issue. Another example in the so-called object-oriented based video coding where multiple video objects are identified, activating one of the block-matching motion estimation profiles can flexibly generate the motion vectors associated with each video object.

After generating the MVs, certain simple statistical measurements (say, mean and variance) of the MVs can be easily computed to yield a "content-complexity indicator" (in MPEG-4 video coding standard, a pneumonic, called $f\_code$). Such indicator is useful to capture or snapshot each video frame in a summarized way. For example, based on the category information of the $f\_code$, one can easily locate where are the duration of the shots that contain high-motion activity.

The segmented regions that correspond to their associated video object respectively can form an alpha-plane mask, which is basically a binary mask for each video object and for each individual frame, contrasting from the background. Based on such alpha-plane information, the user can easily engage interactive hypermedia-like functionality with the video frames. For example, the user can click on any video object of interest at any time, say, a fast-moving racing car, then an information box will be popped up and provide some pre-stored information, such as the driver's name and age, past driving record and Grand Prizes awarded, and other relevant information. Note that each video object has its own associated information box, and its trajectory can be served as a reliable linkage of the alpha-plane masks of the same video object.

The generated motion vectors as above-mentioned could be further processed for conducting intelligent content-based indexing and retrieval. For example, how to search relevant multimedia materials (say, video clips) over large database and retrieve those containing identical or very similar content to that of the query would be very desirable to many applications, such as Internet search engine and digital library. Rather than relying on conventional approach, that is, keywords only, the so-called content-based search is fairly promising and effective in achieving the above-mentioned objective, since the "content", like color, texture, shape, video object's motion trajectory, and so on, are often hard, and sometimes impossible, to describe in words. Therefore, the content-based search of multimedia materials is powerful and effective to facilitate this purpose. Obviously, it is not a trivial task, and in fact, needs a suite of intelligent processes. Besides other prominent features such as color, textures, shape, and so on, motion trajectory is another important key feature to digital video. In this invention, the content is specifically meant for the motion trajectory of video object identified from the given digital video clip. The remaining of this invention presents such method that is capable of automatically identifying multiple moving video objects and then simultaneously tracking them based on their motion trajectories generated, respectively. In this scenario, the user can impose a query by drawing a curve on computer, say, a parabola curve to signify a diver's diving action in order to search those video clips that contain such video content.

Our invention essentially provides a fundamental core technology that mimics human being's capabilities on detecting moving video objects and tracking the objects' individual movement to a certain degree. A typical application that can benefit from this invention is as follows. In the environment of security surveillance, intruded moving objects can be automatically detected, and the trajectory information can be used to steer the video cameras to follow the movement of the video objects while recording the incidences. Another application example can be found in digital video indexing and retrieval.

SUMMARY OF THE INVENTION

It is an object of the present invention to provide a scalable system that integrates several methods for performing fast block-matching motion estimation to generate motion vectors for video compression and/or as the required input data to conduct other video analysis.

It is a further object to provide implementation hardware architecture for realizing the core (i.e., diamond search) of these fast block-matching motion estimation algorithms.

It is a further object to provide a method that is simply based on the motion vectors information to search video database and identify those video clips containing video objects with best matching trajectories associated with that from a video clip under query or a trajectory curve drawn by user.

It is a further object to provide a generic solution for measuring the degree of similarity of two chain-codes under comparison, where each chain-code is obtained from converting the original discretized information encountered in various applications, such as handwriting curves, musical notes, extracted audio tones, and so on.

In summary, these and other objects of the present invention are achieved by a system comprising means for generating motion vectors using any one of available fast block-matching motion estimation techniques organized and integrated in a scalable fashion to optimally meet the demand of various tradeoffs (such as, speed-up gain, complexity, video quality, etc.), means for realizing the core of these motion estimation techniques for hardware implementation, means for smoothing noisy raw data, means for clustering the motion-vector data and validating the clusters so as to automatically detect the video objects, means for estimating motion trajectory of each detected video object, means for comparing each derived motion trajectory curve with respect to a database of motion trajectories, means for receiving a query trajectory and means for identifying video clips having video objects best matching the query motion trajectory.

BRIEF DESCRIPTION OF THE DRAWINGS

FIGS. 11($a$) and 11($b$) show the time scheduling of current-block data and reference-block data, respectively.

DETAILED DESCRIPTION OF THE INVENTION

Figure 1:
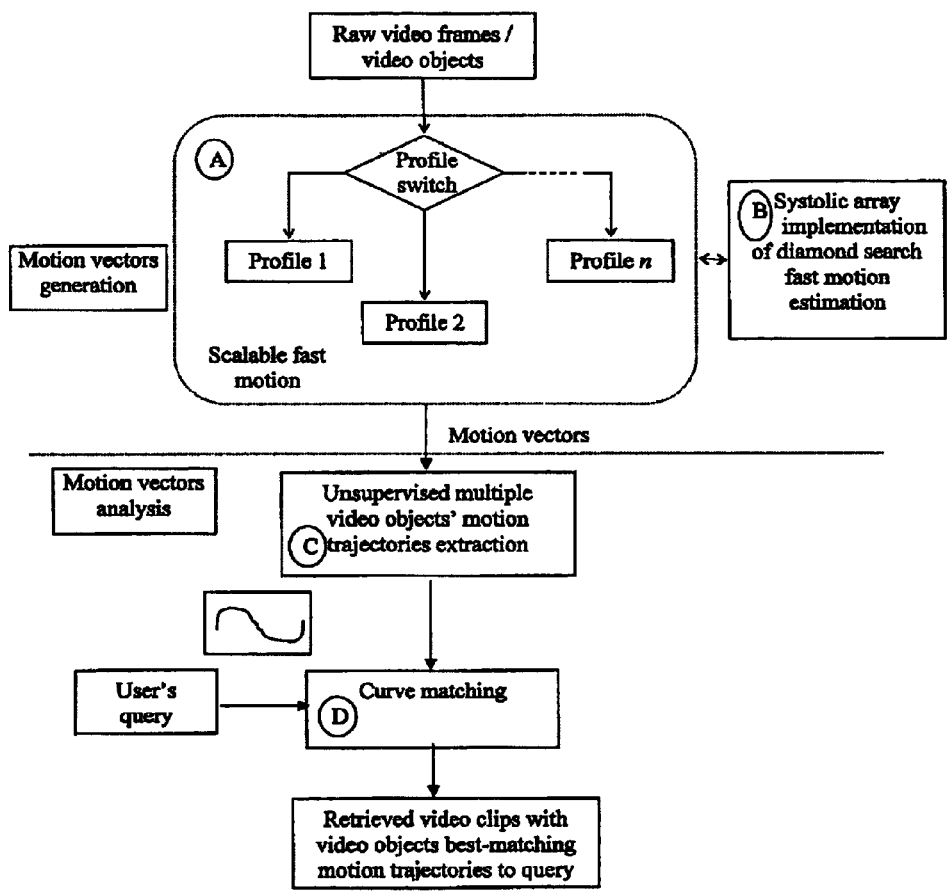
FIG. 1 is an overview of the system and method according to the present invention.

The invention is best organized and described as comprising four parts, Parts A, B, C, and D, and the entire system consists of these four parts is illustrated in FIG. 1. Part A is the scalable fast block-matching motion estimation method for generating motion vectors efficiently, with considerations of multiple factors' tradeoff, such as computational gain, complexity, video quality, system and application requirements. Part B presents a systolic-array implementation architecture for realizing the computationally-intensive core computation of the diamond search system described in Part A, from the hardware point of view. Part C is the method for the generation of motion trajectory of each detected video object, which consists of a series of data operations: smoothing of motion vector field, formation of data clusters through clustering over the smoothed field, formation of video objects through validation process, and motion trajectory generation of each detected video object. Part D is the method for matching and recognition of chain-coded information, including hand-drawn curves, characters, symbols, or even musical notes and extracted audio tones.

Part A. Scalable Fast Block-Matching Motion Estimation

The invention in this part presents a scalable fast block-matching motion estimation system for the generation of motion vectors (MVs), which is indispensable in certain applications, such as video compression system for visual communications. The invention of scalability introduced in this fast motion estimation system can be realized on two aspects: search pattern scalability and search distance computing scalability. For the former, multiple block-matching motion estimation (BMME) algorithms are introduced, while for the latter, a simple downsampling process on pixel field would be effective. Individual or combined usage of the above-mentioned two scalability factors would dynamically control the generation of motion vectors flexibly, efficiently and optimally, while meeting important requirements and constraints, such as computational gain, complexity, quality-of-service (QoS), networking dynamics and behaviors, as well as inherent processing modes from the other parts of the parent system.

Figure 2A:
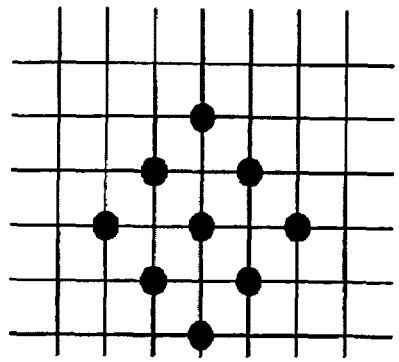
FIGS. 2($a$) and 2($b$) are diamond search patterns for frame-predictive motion estimation in non-interlaced (or progressive-scanned) video.
Figure 2B:
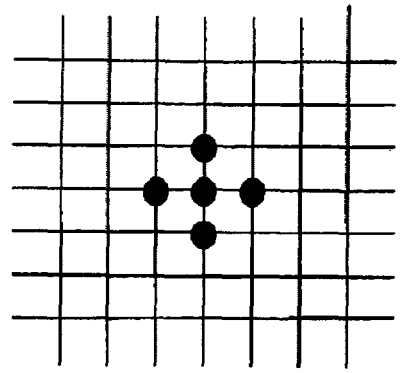
Figure 3A:
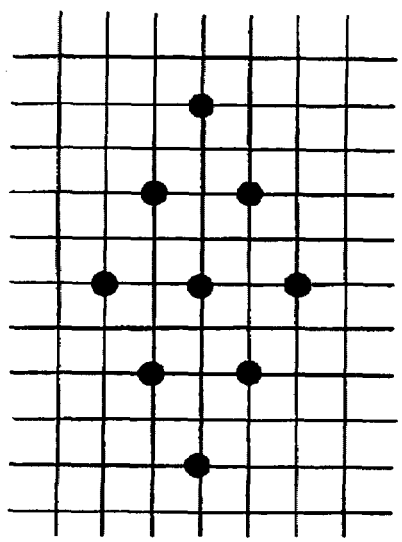
FIGS. 3($a$) and 3($b$) are diamond search patterns for field-predictive motion estimation in interlaced video.
Figure 3B:
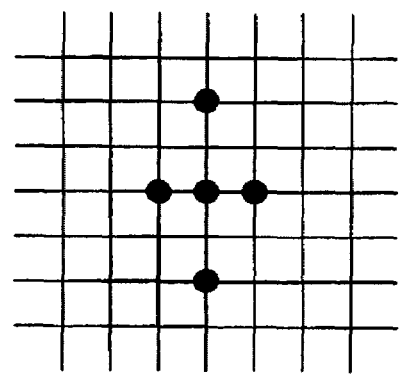

As mentioned earlier, these BMME methods presented here commonly share a common component, called small diamond search pattern (SDSP), in their local refined search. Furthermore, as digital video has two kinds: non-interlaced (or progressive-scanned) and interlaced, therefore, new search patterns are needed for each of these two categories. The design of search patterns and their associated search strategy (or procedures) are instrumental to produce faster search and more accurate motion vectors. Based on the earlier-developed Diamond Search (DS) search patterns, which are used in frame-based motion estimation for non-interlaced video, as shown in FIG. 2, the counterparts of large diamond search pattern (LDSP) and small diamond search pattern (SDSP) for field-based motion estimation in interlaced video are shown in FIG. 3, respectively. With such design, the entire procedures of DS in the non-interlaced case can be totally applied to interlaced video by using these search patterns shown in FIG. 3. In addition, the input video data do not need any extra data re-ordering processing, such as separating the entire video frame into two fields: even field and odd field.

Figure 4:
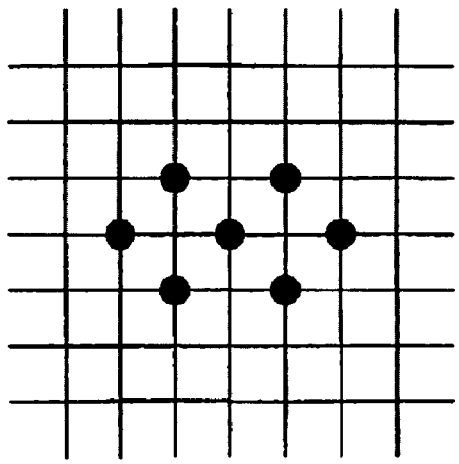
FIGS. 4($a$) and 4($b$) are hexagon search patterns for frame-predictive motion estimation in non-interlaced (or progressive-scanned) video. For interlaced video, the interlaced hexagon search pattern as shown in 4($c$) will be exploited for field-predictive motion estimation.

Another search pattern, called hexagon search pattern (as shown in FIG. 4), has less search points involved with possibly slight degradation on the video quality, compared with the above-mentioned diamond search patterns. In frame-predictive motion estimation for non-interlaced video, if more motion content is along the horizontal direction, then the horizontal hexagon search pattern (HHSP) can be used; otherwise, applying vertical hexagon search pattern (VHSP). In field-predictive motion estimation for interlaced video, only one type of hexagon pattern, called interlaced hexagon search pattern (IHSP) will be used throughout for both even field and odd field, as this pattern has inherent interlaced structure (with one alternative line skipped for search) and fairly symmetrical.

Figure 5:
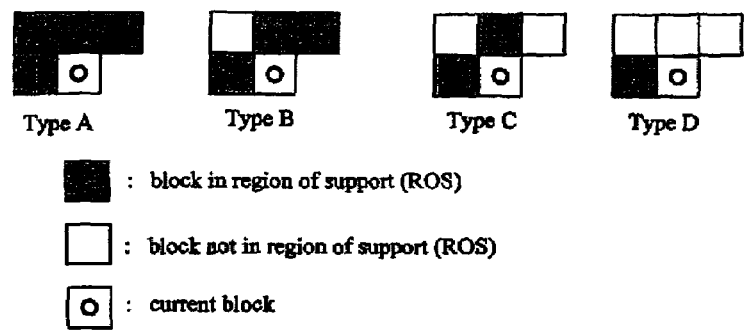
FIG. 5 shows various types of regions of support (ROS).
Figures 6A, 6B:
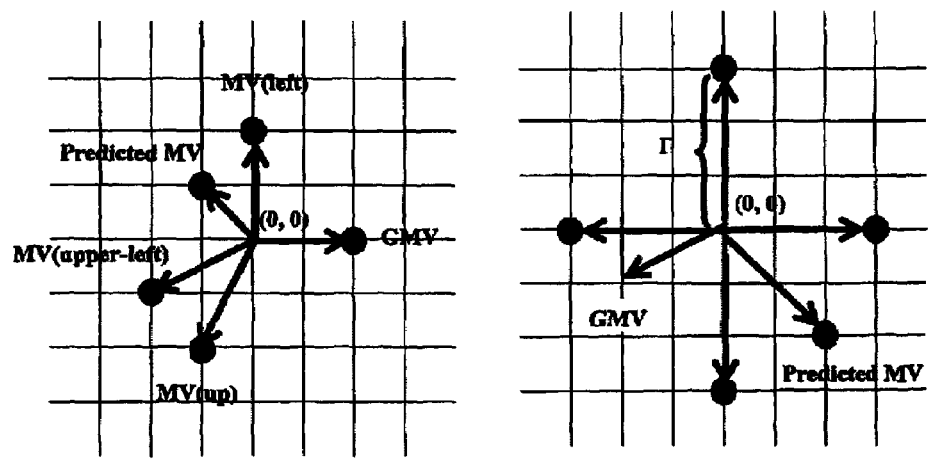
FIGS. 6($a$) and 6($b$) as an illustration of motion adaptive pattern (MAP) and adaptive rood pattern (ARP), respectively, for being used in the initial search in order to identify the best position for local refined search for each block.

In many typical videos that contain fairly large motion content (e.g., sports) and/or peculiar motion content (e.g., cartoon, animation, video games), region-of-support (ROS) based prediction information and/or temporal information would be very helpful in producing more accurate motion vector results. Thus, more sophisticated fast block-matching motion estimation methods are imperative and invented here. For that, new search patterns, called motion adaptive pattern (MAP) and adaptive rood pattern (ARP) are introduced. MAP is composed of several intelligently chosen search positions, which could be formed based on the positions from the origin (0, 0) of the current macroblock (or block, in a more general term and shall be interchangeably used, thereafter), the predicted motion vector of the chosen ROS as shown in FIG. 5 from the spatial domain, temporally nearby motion vectors, and computed global motion vector (GMV). For example, three motion vectors from the type B of FIG. 5, together with median-predicted motion vector, (0, 0) and GMV, can be the six search points of MAP in FIG. 6($a$). Hence, MAP has a dynamic or irregular shape established for each macroblock. ARP, which can be viewed as a less irregular MAP, is also invented as shown in FIG. 6($b$). ARP has a rood shape with four arms constantly maintain at the directions in east, west, south and north, respectively. The length of rood-arm, $\Gamma$, is adaptively computed for each block initially, and the $\Gamma$ is equal to the maximum of the city-block distance of the median-predicted motion vector, based on the ROS chosen. For each block's motion vector generation, MAP (or ARP, if used) will be used only once at the initial search stage to identify where is the most promising position to begin the local search from that position. Once the position is found, only SDSP will be used throughout the remaining search process until the motion vector is found.

In our scalable block-matching fast motion estimation, each method or algorithm is called a profile. As mentioned earlier, all the profiles share either frame-based SDSP (FIG. 2($b$)) or field-based SDSP (FIG. 3($b$)), depending on whether it is concerned with non-interlaced or interlaced video, respectively. In the following, search pattern scalable profiles are individually described, and they are directly applicable either to frame-based or field-based fast motion estimation.

Profile 1 (or "Simple" Profile)—only the SDSP (FIG. 2($b$) for frame-based and FIG. 3($b$) for field-based) is used throughout the entire search.

That is, in each search stage, the search point that yields the minimum matching error will be used as the search center of the new SDSP for the next search. Such process will be repeated until the center search point of SDSP yields the minimum matching error.

Profile 2 (or "Basic" Profile)—either LDSP (FIGS. 2($a$) for frame-based and 3($a$) for field-based) or hexagon search patterns (FIGS. 4($a$) and 4($b$) for frame-based or FIG. 4($c$) for field-based) is constantly used until the last step when the pattern's center position yields the minimum SAD. In such case, only SDSP (FIG. 2($b$) for frame-based and FIG. 3($b$) for field-based) will be used only once, and wherever yields the minimum SAD will be considered as the position of found motion vector for that macroblock. Note that when LDSP is used, this is basically the DS. (In fact, we can view this Basic profile as two sub-profiles: Basic-Diamond profile and Basic-Hexagon profile.);

Profile 3 (or "Pattern Adaptive" Profile)—either SDSP or LDSP is dynamically determined to be used for each block at its initial search. The decision of which one should be used can be made based on whether LDSP has been ever exploited during the search in the earlier-computed neighboring block(s) incurred in the ROS. If no LDSP were used in the ROS, only SDSP will be used for the current block's motion vector generation; otherwise, Profile 2 will be activated. Alternatively, other simple decision logic (such as majority vote) could be practiced.

Figure 4B:
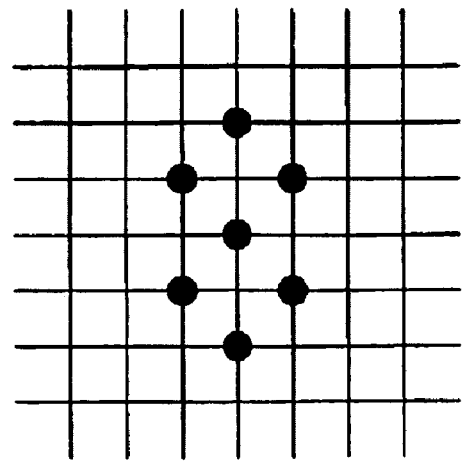

Similarly, we can substitute LDSP by hexagon search patterns. In the non-interlaced case for performing frame-based motion estimation, we can further have two choices: HHSP and VHSP, as shown in FIGS. 4(a) and 4(b), respectively. The decision could depend on a certain simple criterion, such as whether the largest vector component in x- or y-direction incurred in the ROS is in the horizontal (using HHSP) or vertical direction (using VHSP). Furthermore, once the HHSP or VHSP is chosen, it can be applied throughout the search for the current block, or dynamic usage of one of these two patterns along the way, based on a simple decision logic.

Figure 4C:
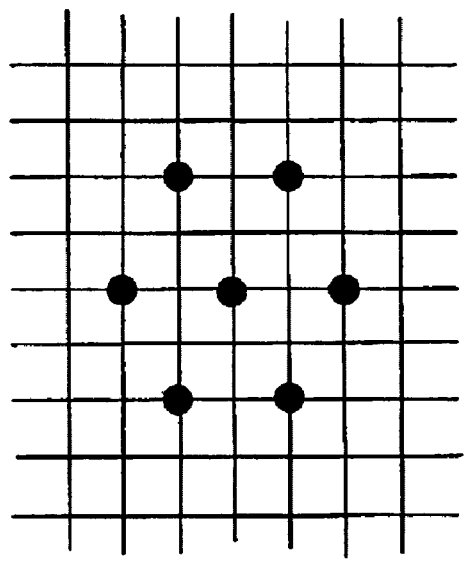

In the interlaced case for performing field-based motion estimation, similar search patterns (as shown in FIG. 4(c)), practice and criterion can be exploited straightforwardly.

Hence, in fact, we can view this Pattern Adaptive profile comprising two sub-profiles: Diamond Adaptive profile and Hexagon Adaptive profile.

Profile 4 (or "Main" Profile)—MAP (or ARP) is activated for the initial search and performed once only. The found position which yields the minimum matching error is viewed as the beginning position and for performing the remaining local search by using SDSP only; that is, enabling Simple Profile onwards until the motion vector is found.

In the above-mentioned, these profiles demonstrate an example of categorizing relevant fast motion estimation methods and put them in a scalable way for optimal usage. In addition, there are certain aspects that are used in our invention with details as follows:

Initialization:
  The motion vectors of the blocks outside the frame are taken to be equal to (0, 0). If the ROS of the current block is defined as the set of blocks to the left, above and above-right of the current block (i.e., type B) for example, the corresponding motion vectors are denoted by $MV_{i-1,j}$, $MV_{i,j-1}$ and $MV_{i-1,j+1}$, respectively. The search-point coordinates can be directly established based on the search patterns LDSP, SDSP, HHSP, VHSP, IHSP, MAP and ARP as shown in FIGS. 2~6, respectively.
  Furthermore, the global motion vector (GMV) is predicted from the motion vector field of the reference frame, and note that GMV is presented in MAP (and ARP) only if the global motion is present and detected in the reference frame.

Determination of Search Range, sr:
  The mean ($\mu_x$, $\mu_y$) and standard deviation ($\sigma$) of the motion vectors of the reference frame are computed. The search range (sr) for the current frame is given by $sr$=maximum of $\{16,((|\mu_x|,|\mu_y|)+3\sigma)\}$.

All search pattern's movement are restricted within the search window defined by the search range, sr.

Detection of No-motion Activity

If the matching error for the current block at the position (0, 0) is less than a threshold T, then the block belongs to the no-motion activity region. In this case, the search ends here with the motion vector for the current block equal to (0, 0). For that, we have two options in choosing the threshold: fixed threshold (we choose T=512, which is quite robust for all kinds of video while maintaining unnoticeable quality degradation) and adaptive threshold described as follows.

For adaptive threshold, a pre-judgement threshold map (PTM) for each video frame is established. Assume that the sum of absolute difference (SAD) is the matching error criterion used here for illustration purpose. Let PTM(i, j, t) be the threshold for the current block (i, j) in the frame t, and SAD(i, j, t−1) be the prediction error of the same block position resulted in the previous frame, t−1. The PTM(i, j, t) can be established as $PTM(i, j, t)=SAD(i, j, t-1)+\delta$, where $\delta$ is the adjustment parameter for adapting some tolerance, such as GMV and the prediction error fluctuation among the temporal neighboring blocks.

Determination of Nonzero Motion Activities
  The ROS of the current block consists of its spatially and/or temporally adjacent blocks whose motion vectors are already determined in earlier stage. In our invention, the local motion vector field at the current block's position is defined as the set of motion vectors of the blocks belonging to the ROS of the current MB. The motion activity at the current block is defined in the present invention as a general function $f$ of the motion vectors in its ROS. Let the evaluated numerical value of function $f$ at the current block be L. We define function $f$ as the maximum of the city-block lengths in our invention. The motion activity at the current block is classified into different categories such as "low", "medium", "high", based on the value of L. Let A and B be two numbers such that A<B. Then the procedure to obtain these categories is illustrated as follows:

Motion activity = Low, if $L$ less than or equal to $A$

= Medium, if $L$ greater than $A$ and, less than or equal to $B$

= High, if $L$ is greater than B.

We choose A=1 and B=2 in our invention for full-pel case. For half-pel and quarter-pel cases, parameters A and B can be scaled and chosen accordingly.

Prediction of the Search Center
  The selection of search center could depend on the motion vector in the MAP of the current block that gives the minimum matching error is chosen as the search center.
  The selection of search center could also depend on the local motion activity at the current block position. If the motion activity is low or medium, the search center is the origin. Otherwise, the motion vector in the ROS of the current block that gives the minimum matching error is chosen as the search center.

Search Distance Computing Scalability: Sub-sampled Computation for Macroblock Distance Measurement
  At each search point visited, the distance of two macroblocks under measurement requires to be computed and used in ranking later on. To effectively reduce the computation, not all the pixels within the block needs to be counted in distance computation. Hence, sub-sampled computation (say, downsampled by a factor of two in both horizontal and vertical directions) can be practiced. Note that the relevant thresholds shall be adjusted accordingly, if effective.

Updating "ƒ_code"

The "ƒ_code" is a special code used in an international video coding standard MPEG-4 in its motion estimation part. The motion activity information computed as above-mentioned can be used to update the ƒ_code, for the purpose of video indexing and other multimedia applications. Since the global motion activities information control the search range parameter, the search range can then update the ƒ_code.

While the above can be used in the present invention, various changes can be made, for example, instead of the above-mentioned search patterns, any other symmetric search patterns might be used. Also, in determining the no-motion activity, instead of comparing the matching error of the current block with a fixed threshold, any other matching metric of the current block may be compared with a threshold. Likewise, when using adaptive threshold, exploiting a memory map of the previous frame for the current frame should be considered as a redundant practice. The function ƒ might be any function of its member motion vectors. For example, the function may evaluate the maximum of the lengths of the motion vectors or the area enclosed by the motion vectors, etc. The motion activity can be classified into more, or less, than the categories mentioned, and the methods for selection of the search center and search strategies can be used in any other combinations other than those described above. All the above-mentioned can be directly applied to video 'frames' or 'fields' in the context.

Figure 7:
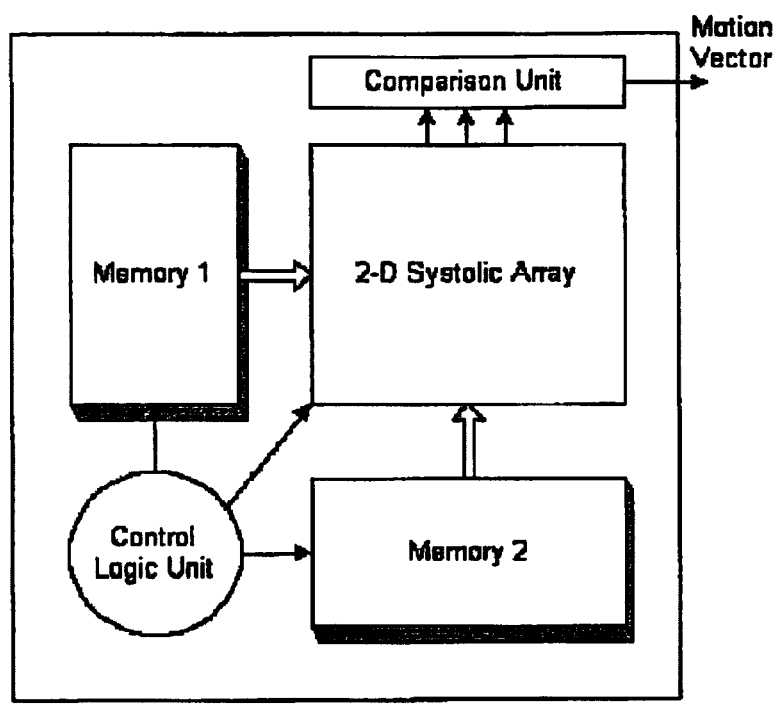
FIG. 7 is a system architecture for a 2-D systolic array.

Part B. A Method and Apparatus of 2-D Systolic Array Implementation for Diamond Search Motion Estimation This part utilizes a systolic array architecture to implement the diamond search fast motion estimation so as to speed up the motion vector generation process. As illustrated in FIG. 7, the proposed system architecture of this component comprises the following parts: (1) 2-D Systolic Array, (2) Memories, (3) Control Logic Unit, and (4) Comparison Unit.

The 2-D Systolic Array consists of a planar arrangement of multiple processing elements (PEs), which perform the arithmetic computations to acquire the summation of absolute difference (SAD) value for each checking point in the diamond search motion estimation method. The results are sent to the Comparison Unit to decide the final motion vector. Memory 1 and Memory 2 are employed to store the current-block data (Cur) and the reference-block data (Ref) to be compared, respectively. Control Logic Unit generates the memory addresses and manipulates the PE operations in the systolic array.

Figure 8:
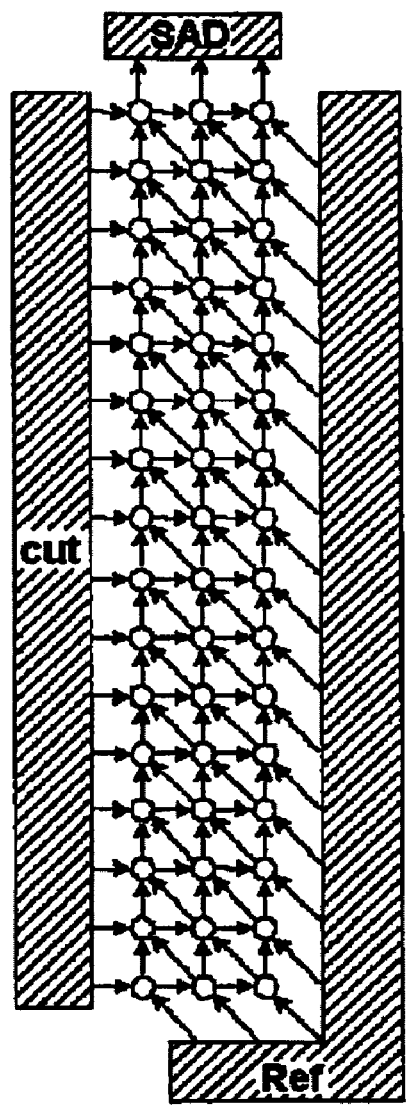
FIG. 8 is an illustration of a systolic array organization.

The 2-D systolic array diagram is shown in FIG. 8. The current-block data Cur, and the reference-block data Ref are inputted to the array from its left line and bottom line, respectively. The resulted SAD values are outputted from the top line of the array.

Figure 9:
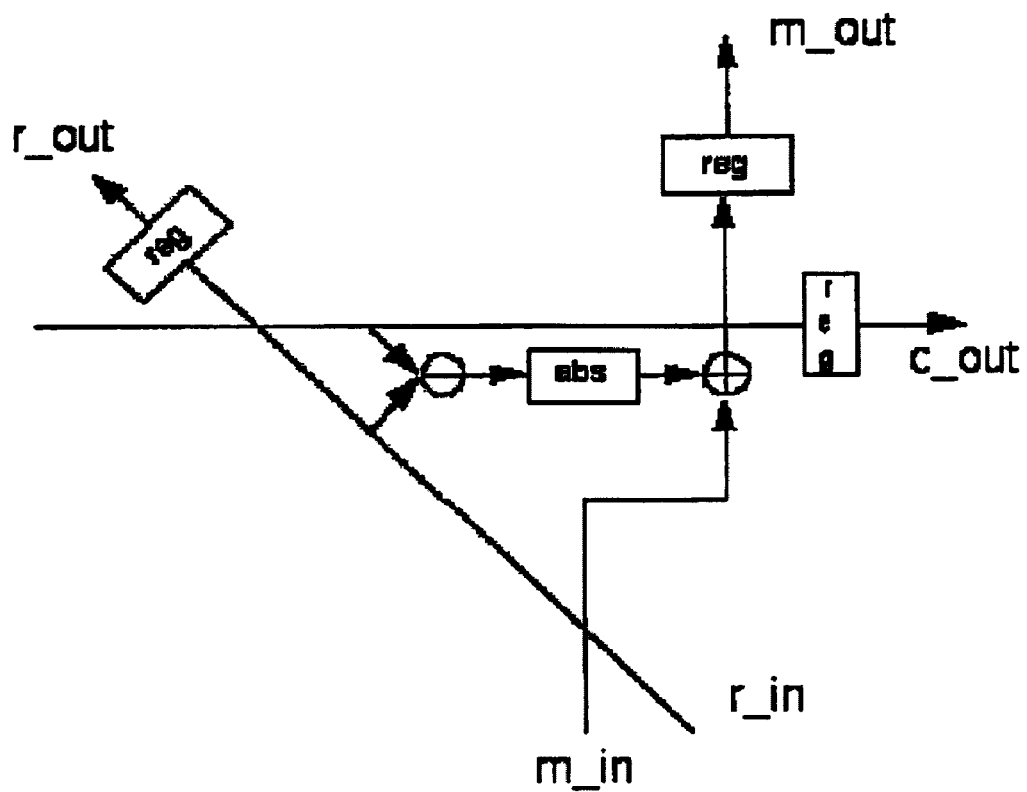
FIG. 9 is a typical processing element structure.

The whole array consists of P×3 PE's, that are arranged in P rows and 3 columns, where P is the width of the current block (in the following, P=16 for demonstration). In each PE, the difference, the absolute-value operation and the summation are performed sequentially. FIG. 9 shows the block diagram of the PE structure, where c, r and m represents Cur, Ref and SAD, respectively.

Memory 1 is composed of P modules where each module contains Q pixels, and Q is the height of the current-block (Q=16 for normal macro block). Memory 2 has P+8 modules which contains all the reference-block data for the surrounding checking points of one large diamond search pattern (LDSP) as described above, so that no memory swap is required when the checking point is moved from one large diamond search (LDS) to another LDS.

Figures 10, 11A:
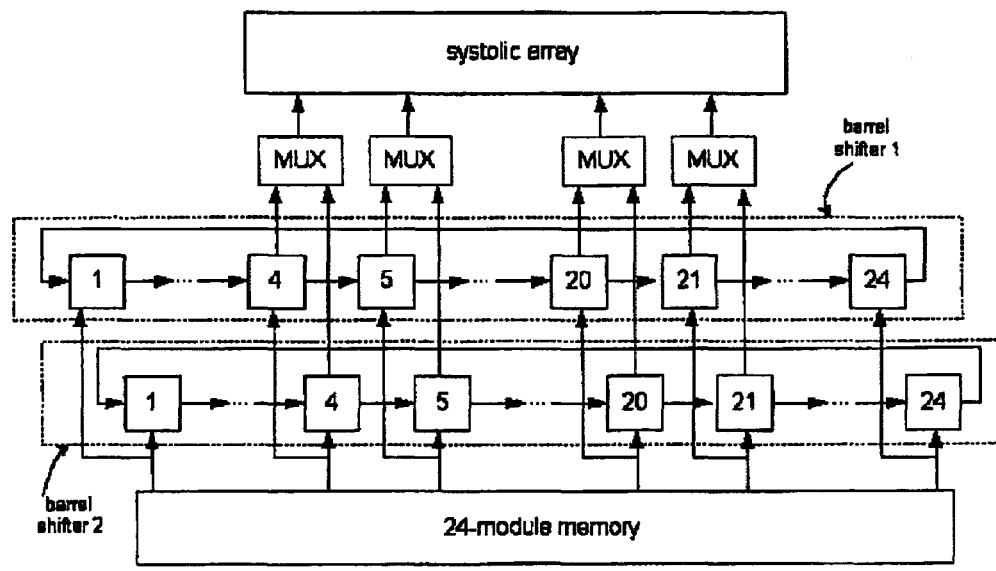
FIG. 10 is an illustration of a barrel shifter architecture.

Each module contains Q+8 pixels, i.e., 24×8 bits for normal motion estimation. To supply the reference-block data into the boundary PE's, two barrel shifters are employed to interface the memory and the boundary PEs, wherein each shifter contains P+8 registers. With the aids of the shifters, the data from the corresponding modules are accessed by the left-shift or right-shift operations when the checking point to be processed is moved horizontally from one to another. The interface connections among the memory, the barrel shifters and the systolic array are shown in FIG. 10.

The Control Logic Unit generates all the required control signals for the memories, the array and the comparison logic. Accurate timing mechanism has to be provided to manipulate the whole data flow of the operations.

Figures 12A, 12B:
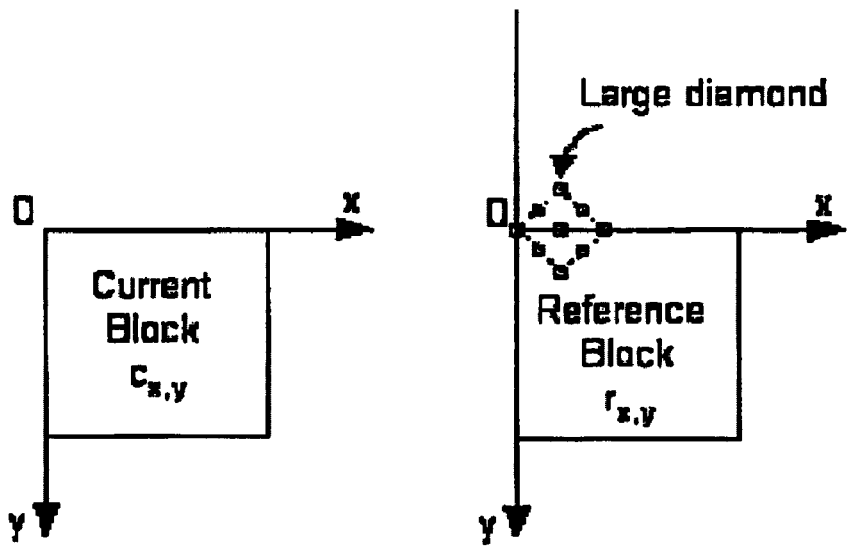
FIGS. 12($a$) and 12($b$) show the actual subscript positions with respect to the positions in the current and reference images, respectively.

FIG. 11 demonstrates the time scheduling for the current-block data and the reference-block data when the LDS is performed in the systolic array. The actual positions that the subscripts represent in the current and reference images are illustrated in FIG. 12. As shown in FIG. 11, the current-block data are inputted into the array as a pipeline mode, whereas the reference-block data are supplied in a parallel manner. Notice that two idle cycles (slot 1 and slot 2 in FIG. 11) are required in order to initiate the PE operations.

The Comparison Unit compares the SAD results from the three PE columns individually and chooses the motion vector where the minimal SAD value occurs in the diamond search. The generated motion vector will be fed into the Control Logic Unit to guide the next search position and perform the above-mentioned steps.

Part C. A Method for Extracting Motion Trajectories of Moving Video Objects based on Motion Vectors The invention of extracting motion trajectories of moving video objects (VOs) based on macroblock motion vectors (MVs) comprises three phases: 1) Motion-vector field denoising, 2) Unsupervised clustering and 3) Bi-directional motion tracking.

1. Motion-vector Field Denoising

Figure 13A:
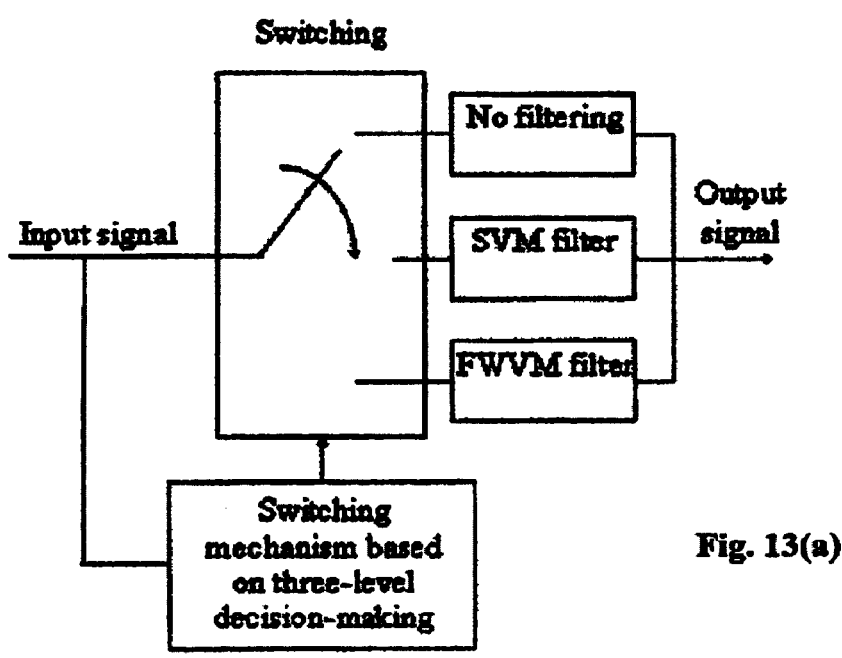
FIG. 13($a$) is an architecture of the switching-based median filter; 13($b$) is the hierarchical decision-making process for identifying each Mv's characteristic and the corresponding filtering action taken.
Figure 13B:
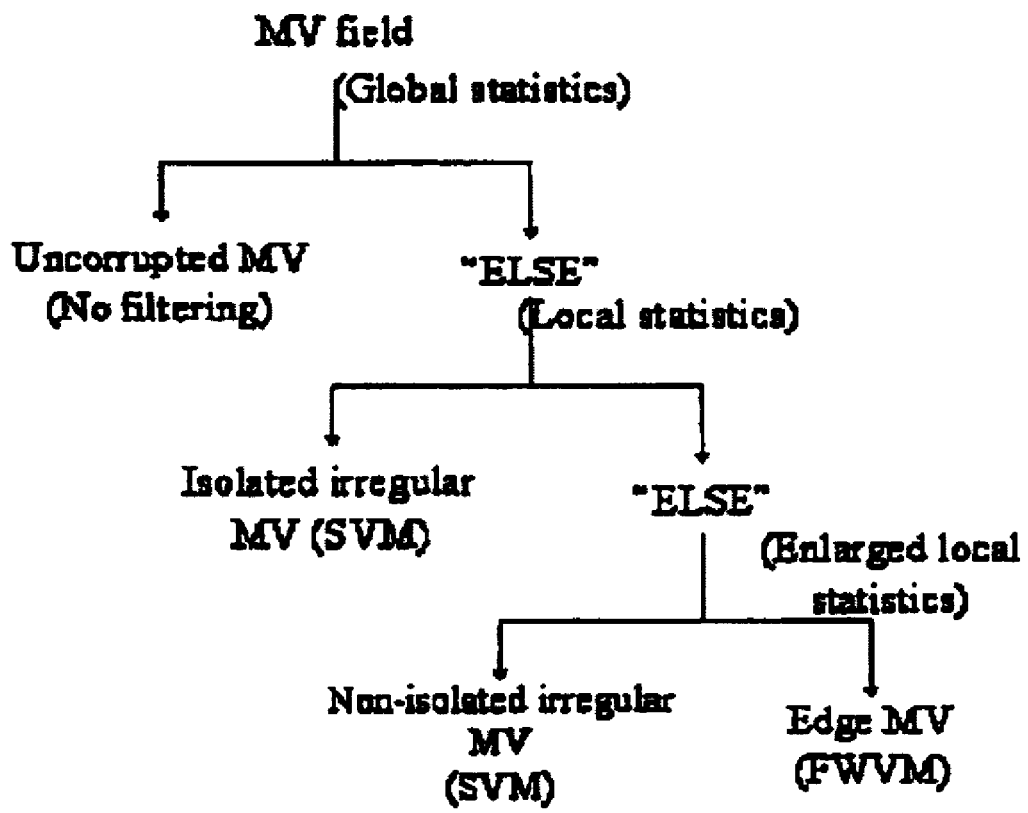

Motion-vector field extracted directly from MPEG or H.26× bitstreams or generated using the techniques described in Part A is first filtered by a proposed noise adaptive soft-switching median (NASM) filter with architecture as shown in FIG. 13(a). The NASM contains a switching mechanism steered by a three-level decision making process to classify each MV to be one of the four identified MV types as outlined in FIG. 13(b). Subsequently, appropriate filtering actions are accordingly invoked.

1.1 Soft-switching Decision Scheme

The first level involves the identification of true MVs. A standard vector median (SVM) filter with an adaptive window size of $W_{D1} \times W_{D1}$ is applied to obtain a smoothed MV field. MV-wise differences $\Delta_i$ between the original MV field and the smoothed MV field are computed. True MVs are identified to be the ones with much smaller differences. To be adaptive to different amount of irregular MVs, steps are repeated twice to estimate the percentage of irregularity q using a 7×7 SVM filter, and followed by selecting appropriate window size by referring to Table 1.

Two optimal partition parameters $p_l$ and $p_u$ are derived as two boundary positions. All MVs with $\Delta_i$ falling onto this range are considered as true MVs. Denote $x_0 \leq x_j \leq \ldots \leq x_m$ as the bin indices of the error histogram $\Delta_i$. Each $n_i$ (for i=0, 1, ..., m) indicates the number of elements falling on the bin i. Parameters $p_u$ is given by $$p_u = \frac{2}{\sum_{i=0}^{m} n_i} \left[ \sum_{i=0}^{m/2-1} n_i\left(x_i - \frac{x_0}{2}\right) + \sum_{i=m/2}^{m} n_i\left(x_i - \frac{x_m}{2}\right) \right]. \quad \text{(EQU 1)}$$

Similar analysis is repeated for the negative part of the distribution. Let bin indices $x_{-m} \leq x_{-m+1} \leq \ldots < 0$, and $n_i$ represents the number of elements in bin i. Parameter $p_l$ is given by, $$p_l = \frac{2}{\sum_{i=-m}^{-1} n_i} \left[ \sum_{i=-m}^{-m/2-1} n_i\left(x_i - \frac{x_{-m}}{2}\right) + \sum_{i=-m/2}^{-1} n_i\left(x_i - \frac{x_{-1}}{2}\right) \right]. \quad \text{(EQU 2)}$$

The percentage of irregularities q is conservatively determined by subtracting the percentage of true MVs from the one-hundred percent.

The second level involves the identification of isolated irregular MVs. Given a MV as the center MV within a $W_{D2} \times W_{D2}$ decision window, the membership values of its neighboring $MV_{s,t}$ within the decision window are defined as $$\mu_{s,t} = \left( \sum_u \sum_v \frac{d_{s,t}}{d_{u,v}} \right)^{-1}, \quad \text{(EQU 3)}$$

for $-(W_{D2}-1)/2 \leq s$, $t \leq (W_{D2}-1)/2$ and $(s, t) \neq (0, 0)$. Parameters $d_{s,t}$ and $d_{u,v}$ are the magnitude-wise differences of $MV_{s,t}$ and $MV_{u,v}$ with respect to the center MV. Parameters u and v have the same value range as s and t, i.e., $-(W_{D2}-1)/2 \leq u$, $v \leq (W_{D2}-1)/2$ and $(u, v) \neq (0, 0)$. Starting with $W_{D2}=3$, the decision window repeatedly extends outwards by one unit in all the four window sides provided that the number of true MVs are less than $(W_{D2} \times W_{D2})/2$, or until $W_F = W_{D1}$. That is, parameter $W_{D2}$ is an odd integer, which satisfies $3 \leq W_{D2} \leq W_{D1}$.

The mean of $\mu_{s,t}$ is used to divide the membership map $\mu_{s,t}$ into two groups—higher and lower-value groups, denoted by $\mu_{low}$ and $\mu_{high}$. The decision rule for detecting an isolated irregular MV is defined by:

(i) If $\mu_{low}/\mu_{high} < 3$, the center MV is claimed as an isolated irregular MV.

(ii) If $\mu_{low}/\mu_{high} > 3$, further discrimination at the third level will be required.

The third level distinguishes the considered center MV as being a non-isolated irregular Mv and an edge MV. The algorithm respectively checks each side of the window boundary of $W_{D2} \times W_{D2}$ obtained in level two. If there is (are) closely correlated MV(s) to that of the center MV at any one of the four boundaries, the boundary will be subsequently extended by one pixel position to obtain an enlarged window. Denote $N_c$ as the number of "closely correlated MVs" within the enlarged window. The decision rule for discriminating non-isolated irregular Mv and an edge MV are:

(i) If $N_c < S_{in}$, the considered MV is a non-isolated irregular MV; otherwise, (ii) If $N_c > S_{in}$, the considered MV is an edge MV.

Threshold $S_{in}$ is conservatively defined to be half of the total number of uncorrupted MVs within the enlarged window.

1.2 Filtering Scheme

For identified true MVs, they are unaltered in order to preserve the fine details of MV field. Standard vector median (SVM) and an invented fuzzy weighted vector median (FWVM) filters are exploited for irregular MVs and edge MVs, respectively. For the proposed FWVM filter, the fuzzy membership function $\mu_{s,t}$ computed earlier are re-used to determine the weights of true MVs within a $W_F \times W_F$ filtering window. The weighting factors of those considered true MVs are defined to be $$\omega_{s,t} = \begin{cases} \frac{\mu_{s,t}}{X}, & \text{for } (s, t) \neq (0, 0), \\ \frac{\mu_c}{X}, & \text{if } s = t = 0, \end{cases} \quad \text{(EQU 4)}$$

where $X = \Sigma \mu_{s,t} + \mu_c$ and $\mu_c/X$ is the weighting factor assigned to the center MV. Parameter $\mu_c$ is optimally determined by minimizing the output data variance such that the noise attenuation will be maximized, which is given by $$\mu_c = \frac{\sum_s \sum_t \mu_{s,t}^2}{\sum_s \sum_t \mu_{s,t}}, \text{ for } (s, t) \neq (0, 0). \quad \text{(EQU 5)}$$

2. Maximum Entropy Fuzzy Clustering

Figure 14:
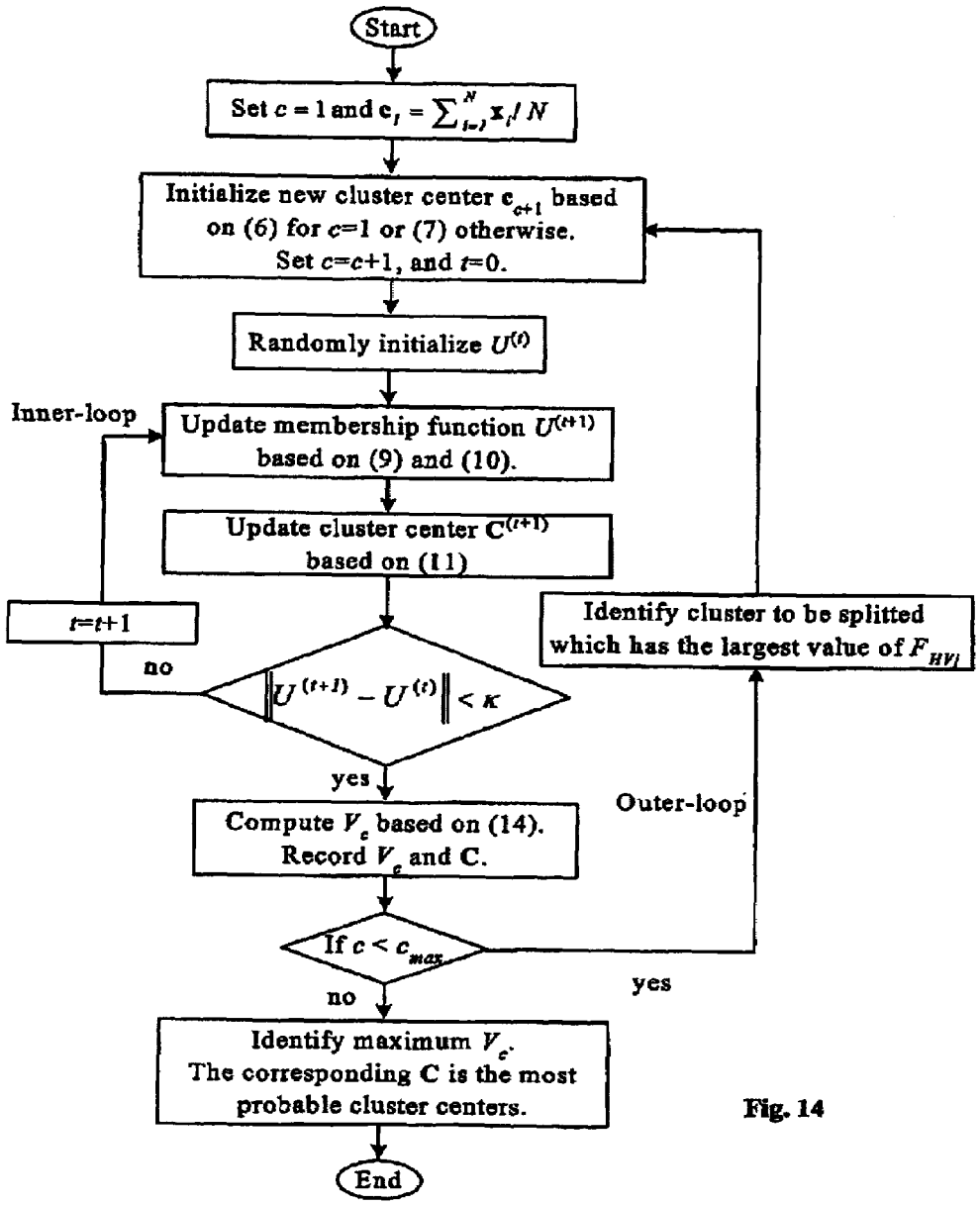
FIG. 14 is the architecture of the maximum entropy fuzzy clustering (MEFC) to achieve unsupervised identification of clusters without any a priori assumption.

The NASM-filtered MVs are then grouped into an optimum number of cluster centers by our invented unsupervised maximum entropy fuzzy clustering (MEFC) to segment MV field into homogeneous motion regions. FIG. 14 shows the architecture of the MEFC.

2.1 Outer Loop

The outer loop recursively increases the number of clusters c from 1 until it reaches to a pre-determined maximum value $c_{max}$, i.e., c=1, 2, ..., $c_{max}$. In each outer-loop iteration, a new cluster center will be initialized to split the largest cluster into two smaller clusters based on the measured fuzzy hypervolume. Denote the input MVs as $\{x_i | x_i \in \Re^s \text{ and } i=1, 2, \ldots, N\}$ and the corresponding cluster centers as $\{c_j | c_j \in \Re^s \text{ and } j=1, 2, \ldots, c\}$. Initially, all data samples are considered belong to one dominant cluster. That is, c=1 and $$c_1^{(0)} = \sum_{i=1}^{N} x_i / N.$$

This dominant cluster is then optimally split into two according to $$c_2^{(0)} = \left\{ x_i \in X \,\middle|\, \max_{x_i} d(x_i, c_1^{(0)}) \right\}. \quad \text{(EQU 6)}$$

In the subsequent iterations, each new cluster center is initialized according to $$c_{c+1}^{(0)} = \left\{ x_i \in X \,\middle|\, \max_{x_i} d(x_i, c_{LH}) \text{ and } \mu_{ij} > \xi \right\}, \quad \text{(EQU 7)}$$

where $\xi$ is a pre-determined confident limit to claim a data sample to be strongly associated to the cluster center of the largest cluster $c_{LH}$.

2.2 Inner Loop

The inner loop recursively updates the membership values and the cluster centers to converge newly initialized and existing cluster centers to each respective new optimum position. The process involves (i) updating the membership values of all the data samples with respect to the cluster centers determined from the previous iteration, and (ii) computing the new cluster centers' positions based on the membership values computed in the current iteration. That is, denote $U=[\mu_{ij}]^{N\times c}$ in fuzzy membership domain $M_f^{N\times c}$ and $C=[c_j]^{c\times s}$ in feature space $\Re^{c\times s}$. The inner process can be presented by recursively updating the following steps $$U=F(C), \text{ where } F:\Re^{c\times s} \to M_f^{N\times c},$$

$$C=G(U), \text{ where } G:M_f^{N\times c} \to \Re^{c\times s}. \quad \text{(EQU 8)}$$

These two steps alternately update each other until a convergence condition is met. That is, $|U_{(t+1)}-U_{(t)}|<\kappa$, where $\kappa$ is a small value.

The membership function $\mu_{ij}$ of the MEFC is derived by maximizing the entropy constrained to minimizing a fuzzy weighted distortion measurement. The membership function is derived to be $$\mu_{ij} = \frac{\exp(-\beta_i d(x_i, c_j))}{\sum_{i=1}^{N} \exp(-\beta_i d(x_i, c_j))}. \quad \text{(EQU 9)}$$

Parameter $\beta_i$ is the Lagrange multiplier introduced in the derivations and are coined as "discriminating factor". The optimal value of $\beta_i$ for i=1, 2, ..., N is obtained to be $$\beta_{i(opt)} = -\frac{\log(\varepsilon)}{d_{i(min)}}, \quad \text{(EQU 10)}$$

where $\varepsilon$ is a small value and $d_{i(min)}$ is the distance of each $x_i$ from its nearest cluster center $c_p$, i.e., $d(x_i, c_p)<d(x_i, c_q)$ for q=1, 2, ..., c and q≠p.

For the updating expression for cluster centers $c_j$, it is given by $$c_j = \frac{\sum_{i=1}^{N} \mu_{ij} x_i}{\sum_{i=1}^{N} \mu_{ij}}, \quad \text{(EQU 11)}$$

To identify the optimum number of clusters c, cluster validity $V_c$ is formulated in terms of intra-cluster compactness and inter-cluster separability to measure the clustering performance of each c value. The cluster's compactness is defined as $$P_{Dj} = \frac{S_j}{F_{HVj}}, \quad \text{(EQU 12)}$$

where $$S_j = \sum_{i=1}^{N} \mu_{ij}/N,$$

$f_{HVj}=[\det(f_j)]^{1/2}$ and $f_j$ is the covariance matrix of jth cluster. For measuring inter-cluster separability, the principle of minimum entropy is exploited to be $$E_j = -\sum_{i=1}^{N} \mu_{ij} \log \mu_{ij}. \quad \text{(EQU 13)}$$

Since we aim to maximize $P_{Dj}$ and minimize $E_j$ for cluster number c, we have the cluster validity measurement defined to be $$V_c = \sum_{j=1}^{c} \frac{\sum_{i=1}^{N} \mu_{ij} P_{Dj}}{N(1+E_j)}. \quad \text{(EQU 14)}$$

With the formulated cluster validity $V_c$, this allows the evaluation of the clustering performance for each cluster number c. MVs will be segmented into an optimum number of regions since the optimal cluster number corresponds to the one that gives a maximum value of $V_c$.

3. Bidirectional Motion Tracking for Motion Trajectory Extraction

Figure 15:
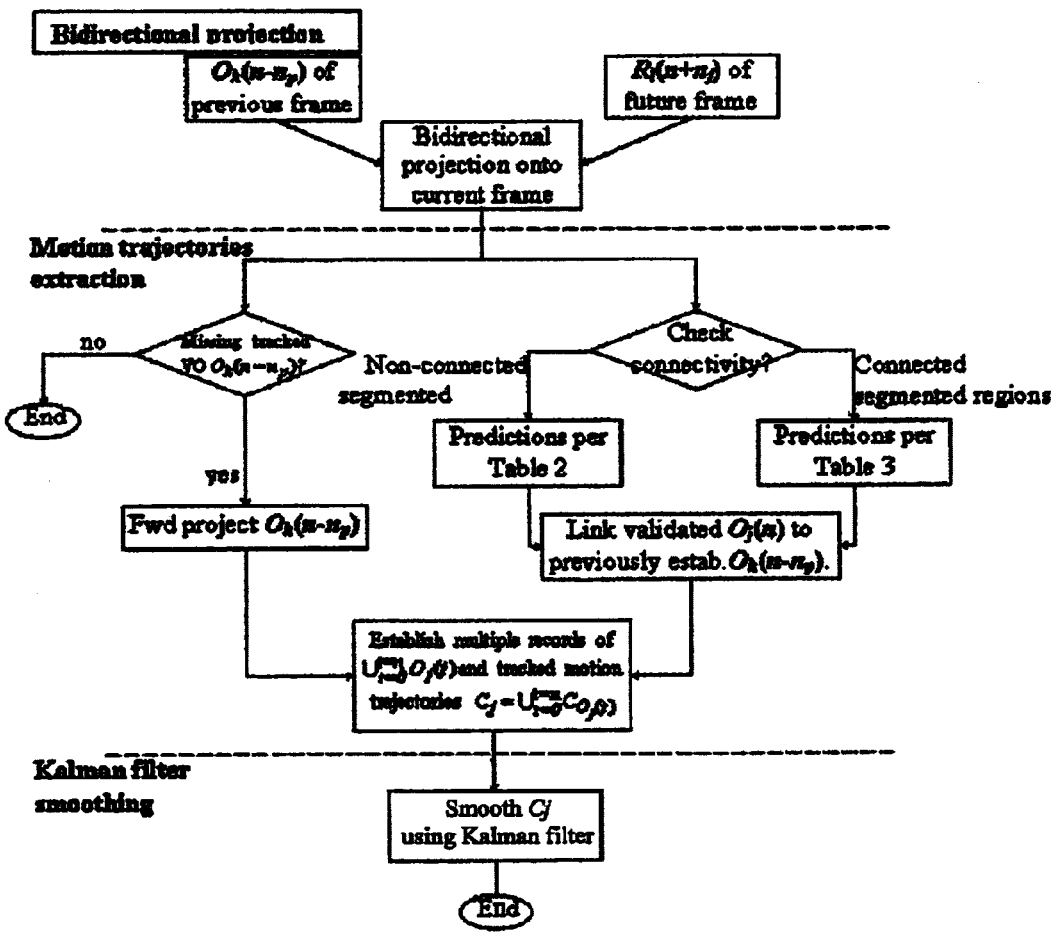
FIG. 15 shows three main stages of the bidirectional motion tracking scheme, comprising bi-directional projection, recursive VO tracking and validating and Kalman filter smoothing.

A bidirectional motion tracking process is then performed to form valid VOs from the segmented homogeneous motion regions. The bi-directional motion tracking is structured into three successive steps, involving bidirectional projection, motion trajectory extraction and Kalmanfilter smoothing, as shown in FIG. 15.

3.1 Bi-directional Projection

Validated VOs from the previous P-frame $O_k(n-n_p)$ and segmented regions $R_l(n+n_f)$ from future P-frame are bi-directionally projected onto current frame based on a second order kinematics model. Motion characteristics of the $O_k$(n–

$n_p$) and $R_i(n+n_f)$ are assumed to be constant in the projection process. Thus, by forwardly projecting $O_k(n-n_p)$ onto the current frame, the resulting displacement in the right and down directions could be respectively expressed by $$D_r^f = v_r^p \times n_p, \quad (EQU\ 15)$$

$$D_d^f = v_d^p \times n_p. \quad (EQU\ 16)$$

The velocities of $O_k(n-n_p)$ in both directions are given by $$v_r^p = \frac{\mu_r^p}{n_{Ref}} \text{pixel/frame}, \quad (EQU\ 17)$$

$$v_d^p = \frac{\mu_d^p}{n_{Ref}} \text{pixel/frame}, \quad (EQU\ 18)$$

where $\mu_r^p$ and $\mu_d^p$ are the means MV of $O_k(n-n_p)$, and $n_{Ref}$ is the number of frames from the reference frame. By the same principles, the displacement in the right and down directions for $R_i(n+n_f)$ in the future frame are expressed to be $$D_r^b = -v_r^f \times n_f, \quad (EQU\ 19)$$

$$D_d^b = -v_d^f \times n_f. \quad (EQU\ 20)$$

3.2 Motion Trajectory Extraction

Each segmented region obtained after the MEFC process may be a valid VO or a section of a valid VO, or even a large region that encompasses few VOs. To identify the semantics meaning conveyed by each segmented region (i.e., unconnected or connected region), our strategy is to identify various possible scenarios that have caused the generation of the segmented regions.

For unconnected regions, let event A describes the interaction between segmented region $R_i(n)$ of current frame and the projected VO(s) $O_k(n-n_p)$ from previous frame, given by $$A = \begin{cases} A_1, \\ A_2, \\ A_3, \end{cases} \quad (EQU\ 21)$$

where $A_1$=event "Considered unconnected region overlaps with one projected VO's motio mask from the previous frame,"

$A_2$=event "Considered unconnected region overlaps with multiple projected VOs' motion masks from the previous frame,"

$A_3$=event "Considered unconnected region overlaps with none of the projected VO's motion mask from the previous frame,"

and $$B = \begin{cases} B_1, \\ B_2, \\ B_3, \end{cases} \quad (EQU\ 22)$$

where $B_1$=event "Considered unconnected region overlaps with one projected homogeneous—motion region from the future frame,"

$B_2$=event "Considered unconnected region overlaps with multiple projected homogeneous—motion region from the previous frame,"

$B_3$=event "Considered unconnected region overlaps with none of the projected homogeneous—motion regions from the future frame."

Actions to be taken for various combination of events (A, B) are concluded into four cases as tabulated in Table II. In Case 1, $R_i(n)$ is mapped to $O_k(n-n_p)$. In Case 2, $R_i(n)$ is mapped to the projected VO that gives the minimum discrepancy in motion direction. In Case 3, $R_i(n)$ is identified be a new VO. Region $R_i(n)$ is spurious noise in Case 4 and subsequently to be discarded.

For connected regions, they interact with the projected $O_k(n-n_p)$ from previous frame and $R_i(n+n_f)$ from future frame in the same way as that of non-connected regions described by events C and D as follows $$C = \begin{cases} C_1, \\ C_2, \\ C_3, \end{cases} \quad (EQU\ 23)$$

where $C_1$=event "Both the considered connected—regions are associated to the same projected VO's motion mask from previous frame,"

$C_2$=event "Both the considered connected—regions are associated to two different projected VOs' motion masks from previous frame,"

$C_3$=event "Both the considered connected—regions are associated to none of the projected VO's motion mask from previous frame."

$$D = \begin{cases} D_1, \\ D_2, \\ D_3, \end{cases} \quad (EQU\ 24)$$

where $D_1$=event "Both the considered connected—regions are associated to the same projected homogeneous region from future frame,"

$D_2$=event "Both the considered connected—regions are associated to two different projected homogeneous—motion region from future frame,"

$D_3$=event "Both the considered connected—regions are associated to none of the homogeneous—motion region from future frame,"

Table III summarizes the actions to be taken for different combination of events (C, D). In Case 5, the connected regions are merged together to form a valid VO, i.e., $$O_k(n) = \bigcup_i R_i(n).$$

In Case 6, the connected region are split into separate and independent VO which are mapped separately to different projected VO $O_k(n-n_p)$. In Case 7, connected regions are merged together to form a new VO. In Case 8, more information from future frames is required to further discriminate connected regions to be (i) different parts of a valid VO or (ii) independent valid VO which initially locate close to each other and will separate into independent regions eventually. In Case 9, region $R_i(n)$ is identified be spurious noise. Thus, the region should be discarded as in Case 4.

Checking of abrupt missing VO is also performed. If this happens, the VO's mask from previous frame is forward projected onto current frame based on second order kinematics model to estimate the new position in the current frame.

Subsequently, motion trajectories of the VOs are estimated by taking the centroid of each VO in each frame, i.e., $$\Psi_j = \bigcup_{t=0}^{t=n} C_{Oj(t)}, \quad (EQU\ 25)$$

where $C_{Oj(t)}$ is the centroid of VO $O_j(t)$ at frame t.

3.3 Kalman Filter Smoothing

In the last stage, the obtained motion trajectories are smoothed by Kalman filtering. The following shows the formulation of the problem into state-space equations to be fed into iteration process of Kalman filtering. The trajectory of the target VO in two-dimensional Cartesian plane at time nT, where 1/T is the frame rate, is defined as $$\zeta(n) = \begin{pmatrix} \zeta_1(n) \\ \zeta_2(n) \end{pmatrix}. \quad (EQU\ 26)$$

The displacement, velocity and acceleration vectors are defined as $$\xi(n+1) = \xi(n) + T\dot{\xi}(n) + \tfrac{1}{2}T^2\ddot{\xi}(n) + \eta_p(n), \quad (EQU\ 27)$$

$$\dot{\xi}(n+1) = \dot{\xi}(n) + T\ddot{\xi}(n) + \eta_v(n), \quad (EQU\ 28)$$

$$\ddot{\xi}(n+1) = \ddot{\xi}(n) + \eta_a(n), \quad (EQU\ 29)$$

where $\eta_p(n)$, $\eta_v(n)$ and $\eta_a(n)$ are the estimation errors, which individually possess Gaussian distribution. Define the state vector of the target VO as $x_i(n) = [\xi_i(n), \dot{\xi}_i(n), \ddot{\xi}_i(n)]^T$ and the corresponding process error vector as $v_i(n) = [\eta_{pi}(n), \eta_{vi}(n), \eta_{ai}(n)]^T$, hence the state equation can be expressed as $$x_i(n+1) = Fx_i(n) + v_i, \quad (EQU\ 30)$$

and the observation vector can be modeled as $$z_i(n+1) = Hx_i(n+1) + \omega_i(n+1), \quad (EQU\ 31)$$

where $F = (1\ T\ \tfrac{1}{2}T^2;\ 0\ 1\ T;\ 0\ 0\ 1)$ and $H = (1\ 0\ 0)$.

With the derived state-space equation given by (30) and (31), the standard Kalman filter will be applied to give smoothed motion trajectories.

Part D Curve Recognition Using Evolutionary Alignment with Concave-Gap Penalty and Complex Scoring Matrix Technique In this part, we introduce a generic approach to perform alignment operation for given two curves under matching and quantitatively measuring their degree of similarity. The term of "curve" here is a generic representation or result of tracing the boundary of a shape, drawing a simple sketch or writing a character/symbol in one continuous stroke, or any such said information generation process/operation. Note that all one-stroke handwriting curves are represented by a chosen chain-coding scheme first. The resulted chain codes as the strings are considered to be a special representation describing the curves individually. To match a pair of curves, their chain-code strings are aligned, compared, and measured.

The evolutionary alignment algorithm is used to quantitatively measure the similarity between two curves described by their chain codes. If two curves are quite similar to each other, most of their chain codes will be matched, and the remaining chain codes can be altered for matching by inserting a code, deleting a code, or replacing a code by another. Each of the above-mentioned operation will incur a score for contributing the final matching score or similarity score (SS) as follows.

Given two strings of curves, $A = a_1 a_2 \ldots a_M$ and $B = b_1 b_2 \ldots b_N$, curve A can be matched by curve B by means of one of three possible operations: (1) deleting k consecutive codes, (2) inserting k consecutive codes, and (3) replacing a code by another. For each above-mentioned symbol operation, a corresponding scoring method is designed. For example, a positive cost for a perfect matching or an unchanged replacement can be imposed. The SS is the final score as the result of matching curve A against curve B by performing these three symbol operations. That is, the SS is a quantitative measurement in evaluating the degree of similarity between curves A and B. Two curves are considered to be quite similar to each other, if the value of SS is high, and the higher the value, the larger the similarity.

One constant or function for the cost of opening up a gap and one constant or function for the cost of inserting or deleting a code is used. For example, two negative constants, g and h, are introduced to establish an affine function:

$$\text{gap}(k) = g + hk, \quad (1)$$

for the penalty incurred in inserting or deleting k symbols. Opening up a gap will cost score g, and each symbol inserted into or deleted from the gap will cost additional score h; thus, penalty score hk for k symbols. For the latter, it means that a set of k symbols from string A is deleted, or a set of k symbols from string B is inserted.

Replacement costs are specified by a scoring matrix $d(a_i, b_j)$, which gives the cost of replacing code $a_i$ by code $b_j$. Note that a code of A remains unchanged, if it is replaced by itself (i.e., when two codes $a_i$ and $b_j$ are perfectly matched) and gains the highest score. Usually, $d(a_i, b_j) > 0$, if $a_i = b_j$, and $d(a_i, b_j) \leq 0$, if $a_i < b_j$. For example, in the application of handwriting character recognition using for 8-directional chain code encoding method:

$$d(a_i, b_j) = \begin{cases} 4, & \text{if } a_i = b_j; \\ -3, & \text{Otherwise.} \end{cases} \quad (2)$$

TABLE 1

Suggested window sizes for various estimated value of parameter q.

| Irregular MV density | Suggested $W_{D1} \times W_{D1}$ |
|---|---|
| 0% < q ≤ 2% | No filtering |

TABLE 1-continued

Suggested window sizes for various estimated value of parameter q.

| Irregular MV density | Suggested $W_{D1} \times W_{D1}$ |
|---|---|
| 2% < q ≦ 15% | 3 × 3 |
| 15% < q ≦ 30% | 5 × 5 |
| 30% < q ≦ 45% | 7 × 7 |
| 45% < q ≦ 60% | 9 × 9 |
| 60% < q ≦ 70% | 11 × 11 |

TABLE 2

Actions to be taken for various combinations of events (A, B).

| Events | $B_1$ | $B_2$ | $B_3$ |
|---|---|---|---|
| $A_1$ | Case 1 | Case 1 | Case 1 |
| $A_2$ | Case 2 | Case 2 | Case 2 |
| $A_3$ | Case 3 | Case 3 | Case 4 |

TABLE 3

Actions to be taken for various combinations of events (C, D).

| Events | $D_1$ | $D_2$ | $D_3$ |
|---|---|---|---|
| $C_1$ | Case 5 | Case 5 | Case 5 |
| $C_2$ | Case 6 | Case 6 | Case 6 |
| $C_3$ | Case 7 | Case 8 | Case 9 |

REFERENCES

1. Shan Zhu and Kai-Kuang Ma, "A New Diamond Search Algorithm for Fast Block Matching Motion Estimation," *International Conference on Information, Communications, and Signal Processing* (ICICS'97), pp. 292–296, 9–12 Sep. 1997.

While preferred embodiments of the present invention have been shown and described, it will be understood by those skilled in the art that various changes or modifications can be made without varying from the scope of the present invention.

The invention claimed is:

1. A scalable block-matching fast motion estimation method for analyzing a plurality of video frames comprising:
    employing at least one block-matching fast motion estimation algorithm profile selected for use with a predetermined application, selected input data and a determined processing mode;
    utilizing available neighboring motion vectors from a spatial and/or temporal domain to form a motion adaptive pattern or an adaptive rood pattern for performing an initial search of each pixel block of the plurality of video frames;
    conducting a local search of the plurality of video frames using a small diamond search pattern;
    conducting an adaptive threshold pre-judgment for detecting no motion blocks in the plurality of video frames;
    computing a local motion activity at each block position of the plurality of video frames;
    computing a global motion activity for each video frame;
    adapting a search range for each block of each video frame;
    predicting a search center for each block;
    and estimating motion in the plurality of video frames.

2. The method of claim 1 wherein the application, input data and processing mode are selected from the group consisting of bit rates required by select video applications, block sizes, selected motion-estimation prediction modes from the group consisting of normal prediction, advanced prediction, frame prediction, field prediction, full-pel, half-pel or quarter-pel prediction, select video object planes (VOPs) having different priorities and quality requirements.

3. The method of claim 1 wherein the profiles are selected from the group consisting of simple, basic, mode adaptive, and main profiles, one or more selected profiles integrated together to form a scalable architecture.

4. The method of claim 1 wherein the adaptive threshold for each block of a video frame is computed based on a function of a matching error incurred in a previous frame.

5. The method of claim 1 wherein the computation of local motion activity at each block position comprises:
    determining a city-block length of each motion vector of each block that lies in a region of support (ROS) of a current block, maximum of the city-block lengths being a grade of local motion activity;
    classifying the local motion activity at the current block position into one of three classes: "low", "medium" and "high", based on three non-overlapping ranges of the grade of local motion activity.

6. The method of claim 1 wherein the computation of the global motion activity for each video frame comprises:
    computing a mean and a standard deviation of all of the motion vectors in a video frame, a grade of global motion activity being defined as a maximum of an absolute values of the components of the mean motion vector plus three times the standard deviation.

7. The method of claim 1 further comprising adapting the search range at each block for motion estimation, wherein the search range of a current frame is adaptively varied to be equal to a grade of global motion activity of a reference frame.

8. The method of claim 1 wherein a local search around a search center is adapted based on a local motion activity.

9. The method of claim 1 wherein the diamond search pattern is elongated in a vertical direction by one pixel.

10. The method of claim 1 further comprising obtaining an code of each VOP and updating the f code for video indexing and retrieval.

* * * * *